United States Patent [19]

Föhl

[11] 4,417,702
[45] Nov. 29, 1983

[54] AUTOMATIC ROLL-UP DEVICE FOR A SAFETY BELT

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 240,153

[22] Filed: Mar. 3, 1981

[30] Foreign Application Priority Data

Mar. 4, 1980 [DE] Fed. Rep. of Germany ....... 3008299

[51] Int. Cl.³ ................. A62B 35/02; B65H 75/48
[52] U.S. Cl. ................. 242/107.2; 242/107.4 A; 242/107.4 B
[58] Field of Search ....... 242/107.2, 107.4 R–107.4 E; 280/806–808; 297/474–478

[56] References Cited

U.S. PATENT DOCUMENTS

| | | | |
|---|---|---|---|
| 3,905,562 | 9/1975 | Kell | 242/107.4 B X |
| 4,177,962 | 12/1979 | Hildebrandt | 242/107.4 B |
| 4,208,770 | 6/1980 | Takada | 242/107.2 X |
| 4,228,970 | 10/1980 | Morinaga | 242/107.4 A |
| 4,241,886 | 12/1980 | Maekawa | 242/107.2 |
| 4,323,204 | 4/1982 | Takada | 242/107.2 |

FOREIGN PATENT DOCUMENTS 1949061 9/1971 Fed. Rep. of Germany .
1416517 12/1975 United Kingdom .

*Primary Examiner*—John M. Jillions
*Attorney, Agent, or Firm*—Herbert L. Lerner; Laurence A. Greenberg

[57] ABSTRACT

Automatic roll-up device for a safety belt with a mechanism for blocking the belt roller in case of danger. The belt blocking device has a control disc of lightweight construction in fixed connection with the belt roller and works in direct conjunction with a vehicle and/or belt sensitive activating sensor. A braking- or clamping device for the belt is arranged after the belt roller in the direction the belt is pulled out. The braking- or clamping device is activated by the blocking of the belt.

13 Claims, 6 Drawing Figures

AUTOMATIC ROLL-UP DEVICE FOR A SAFETY BELT

BACKGROUND OF THE INVENTION

1. Field of the Invention

The invention relates to an automatic roll-up device for a safety belt with a mechanism for blocking the belt roller in case of danger, which can be automatically activated by a control element when a predetermined acceleration or deceleration of the vehicle is exceeded.

2. Description of the Prior Art

In the known automatic roll-up devices for safety belts (U.S. Pat. No. 3,901,459) a wind-up spring is arranged at one side of the belt roller which is fastened in a stable housing, while the opposite shaft end is in connection with a locking pawl mechanism and a release mechanism, whereby in the case of danger, i.e. in the case of an accident, the release mechanism, for example of the inertial mass type, acts on a control disc and said control disc effects through the locking pawl mechanism the blocking of the belt band. In this system, the total pulling force acts on the locking pawl mechanism and on the belt shaft so that these parts must be very strong and massive to withstand the extremely high pull-forces in case of danger.

On the other hand, braking- or clamping devices for belt bands have been described (Great Britain-Patent Specification No. 1,416,517, German Pulbished Non-Prosecuted Application No. 19 49 061), wherein the belt is deflected over several brake rollers, so that at the occurrence of a pulling force, the belt is braked by the thereby created friction forces, or wherein the belt is mechanically fixed by pressure between clamping jaws or clamping rollers, and is prevented from being pulled out any further.

SUMMARY OF THE INVENTION

An object of the invention is to provide an automatic roll-up device of the mentioned type which, in case of danger, will assure the complete blocking of the belt in a very short time. A further object is to provide structural elements which effect the blocking which are simple, economical and can be easily assembled, and are especially suitable for making a lightweight structure.

With the foregoing and other objects in view, there is provided in accordance with the invention an automatic roll-up device for a safety belt with a mechanism for blocking the belt roller in case of danger, which can be automatically activated by a control element when a predetermined acceleration or deceleration of the vehicle is exceeded, said mechanism for blocking the belt comprising, a control disc of lightweight construction in fixed connection with a belt roller rotatably mounted in a housing, a vehicle sensitive activating sensor and a belt sensitive activating sensor acting in direct conjunction with the control disc, and locking means to effect blocking of the belt roller connected to the control disc, and a braking- or clamping device arranged after the belt roller and through which the belt from the automatic roll-up passes in the direction the belt is pulled out, said braking or clamping device activated by the blocking of the belt to prevent movement of the belt.

Other features which are considered as characteristic for the invention are set forth in the appended claims.

Although the invention is illustrated and described herein as embodied in an automatic roll-up device for a safety belt, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

Figure 1:
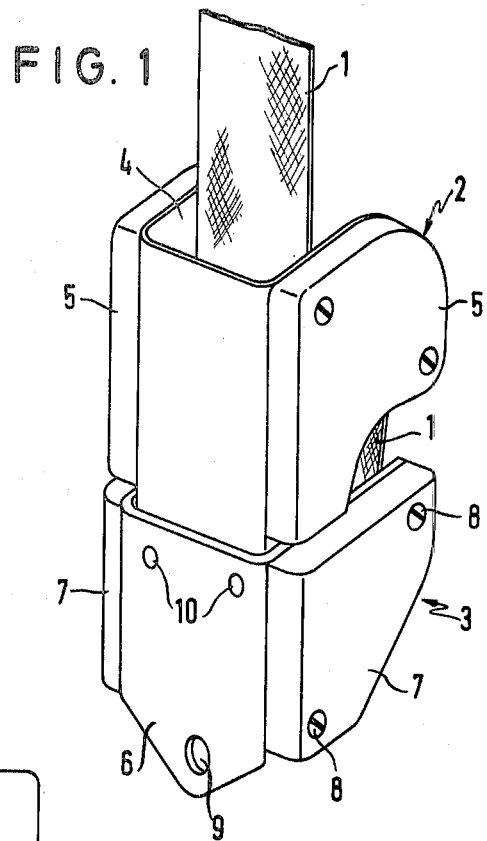
FIG. 1 is a perspective representation of the whole automatic roll-up device according to the invention showing the safety belt extending from the roll-up device in which the U-shaped housing and side covers are visible and adjoining it the braking device with visible U-shaped housing and side covers.

In accordance with the invention, the belt blocking device has a control disc of lightweight construction which is in fixed connection with the belt roller and works in direct conjunction with a vehicle- and/or belt sensitive activating sensor. A braking- or clamping device for the belt is arranged after the belt roller in the direction of the belt is pulled out, and can be activated by the blocking of the belt. By combining the device for the belt roller blocking and the braking- or clamping device, the device for blocking the belt roller has the advantage of essentially serving only as a control device for operating the braking- or clamping device, and therefore, can be designed as a lightweight structure—made of aluminum or plastic—because this device is not stressed by the high pulling forces occurring at a crash. However, these forces can be absorbed by the braking- or clamping device. Consequently, in addition to the structural and manufacturing advantages, it makes it possible to shorten considerably the response time in which the mentioned arrangement reacts to the pulling forces. This may be accomplished, for example, by providing the locking teeth of the control disc with a very fine tooth distribution, which can be done without reducing the safety function, because no large force act on the control disc which causes the blocking of the belt roller.

The automatic roll-up device has a control disc provided with outer teeth which can be engaged by a locking lever of a vehicle-sensitive activating sensor. The control disc also carries a belt sensitive inertial mass which is hingeable against the force of a spring, and which can engage with a set of inner teeth which are fixed at the housing surrounding the control disc spaced a distance away. With this arrangement of roll-up device, the activation of the sequentially following braking- or clamping device is assured for any thinkable circumstances.

Further advantageous details are explained in the typical embodiments shown and described in the drawings.

FIG. 1 shows a schematic view from the back of an automatic roll-up device 2 for a safety belt 1, which consists essentially of a mechanism for blocking the belt-spool and a braking- or clamping device 3. A U-shaped housing 4 with side covers 5, serves as the carrier for the automatic device 2. A U-shaped housing 6 serves as the carrier for the braking- or clamping device 3. Covers 7 on both sides of housing 6 are attached with screws 8 to the free legs of housing 6. The intermediate parts of the two housings 4 and 6 are connected with each other forming an integral structural unit. This unit can be secured to the frame of a motor vehicle by the mounting opening 9. Rivets 10 may be used to connect the two housings 4 and 6.

Figure 2:
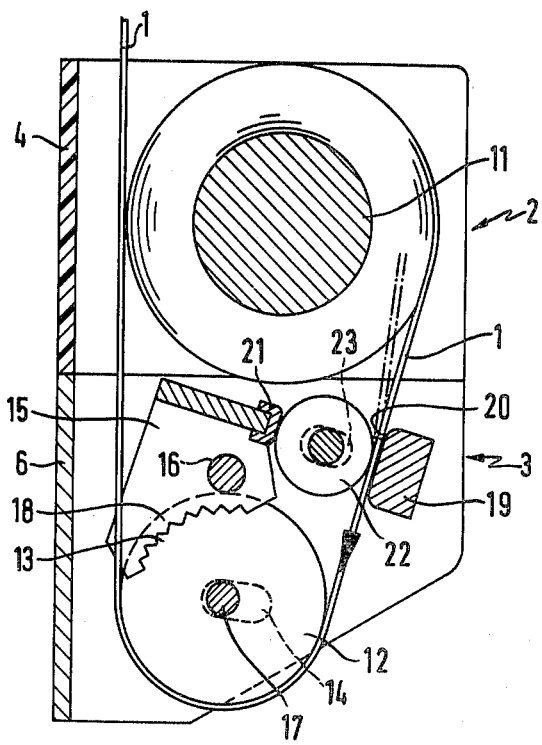
FIG. 2 is a simplified cross-section of the automatic roll-up device according to FIG. 1, and illustrates how the belt from the roll-up device is clamped between a bar and a roll and then continues around a brake and upward through the device.

FIG. 2 shows a median section through the automatic roll-up device according to FIG. 1. The device 2 for blocking the belt 1 schematically shows only belt roller 11 on which a certain amount of stored belt 1 is rolled up. The pull-out direction of the safety belt 1 is indicated by an arrow. The arrangement designated by 2 in FIG. 2 contains vehicle sensitive, and safety belt sensitive activating elements—not shown—by which the belt roller 11 as it rolls off is instantaneously blocked by the effect of a predetermined acceleration on the vehicle or on the person. The braking- or clamping device 3 is arranged after the belt roller 1 in the roll-out direction. The braking- or clamping device 3 contains a brake roller 12 which is provided with a smooth non-skid, high friction surface with locking teeth 13 on both sides of the smooth running surface. The braking roller 12 with its locking teeth 13 is slideably supported in the slots 14 of the housing 6. A metallic locking pawl 15 which can swing around an axis 16 is arranged at the housing 6 in the immediate vicinity of the braking roller 12. By a spring, not shown, which is supported at one side at a stop on the locking pawl 15, and at the other side at the support shaft 17 of the braking roller 12, in the rest position, the braking roller 12 is held to the right in the slots 14 as shown in FIG. 2 and the locking pawl 15 is held counter-clockwise. In this position the locking teeth 13 of the braking roller 12 are spaced from the circle segment-like teeth 18 of the locking pawl 15. A clamping bar 19, which is in a slightly slanted position is fixedly supported and held stationary between the U-shaped legs of the housing 6. A clamping roller 22 is arranged between the clamp surface 20 of the clamping bar 19 and a pressure pad 21 of the locking pawl 15. The support shaft of the clamp roller 22 is slideably supported in the slots 23 of the housing 6. The clamp roller 22 is kept in a normal position in which the clamp roller surface is a distance from the clamp surface 20 of the clamping bar 19 by a form-spring which is tensioned between the clamping bar 19 and the clamp roller 22, or its support shaft. The belt 1 is partly wrapped around the surface of the braking roller 12. At the side in the guide path of the belt band 1 is the clamping bar 19, which has rounded corners over which the belt 1 slides easily or a distance may separate them. In this embodiment the clamping roller 22 also rests lightly on the belt and rotates with it. In the event the system is activated, i.e. when strong pull forces are acting on the belt band 1, the belt roller 11 is immediately blocked in the manner described below. By the pulling forces acting on the belt 1, the braking roller 12, FIG. 2, with its locking teeth 13 is pressed into the locking teeth of the locking pawl 15, causing the braking roller 12 to be blocked or arrested.

Now the braking roller 12 on which a turning moment is still acting, presses the locking pawl 15 in the direction toward the clamping bar 19, whereby the pressure pad 21 bears onto the clamp roller 22, and the latter, in turn, clamps the belt 1 against the clamping surface 20, and blocks it thereby. The clamping force increases as the pull on the belt 1 increases. After this action, no forces are acting on the mechanism which blocks the belt roller; all forces are absorbed by the explained braking- and clamping arrangement.

Figure 3:
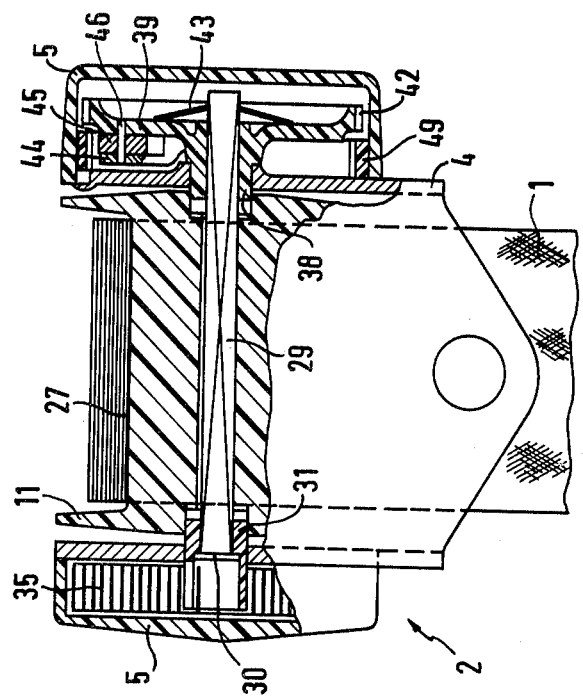
FIGS. 3 and 4 show a part of the automatic roll-up device according to FIGS. 1 and 2, and, in particular, the arrangement for blocking the belt roller, in a schematic side view and a sectional view from above.
Figure 4:
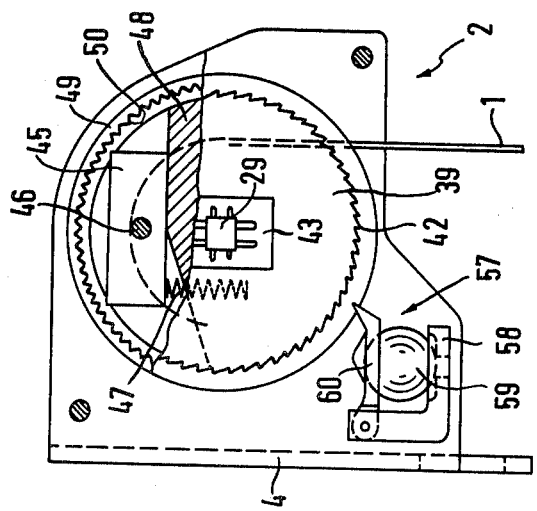
Figure 5:
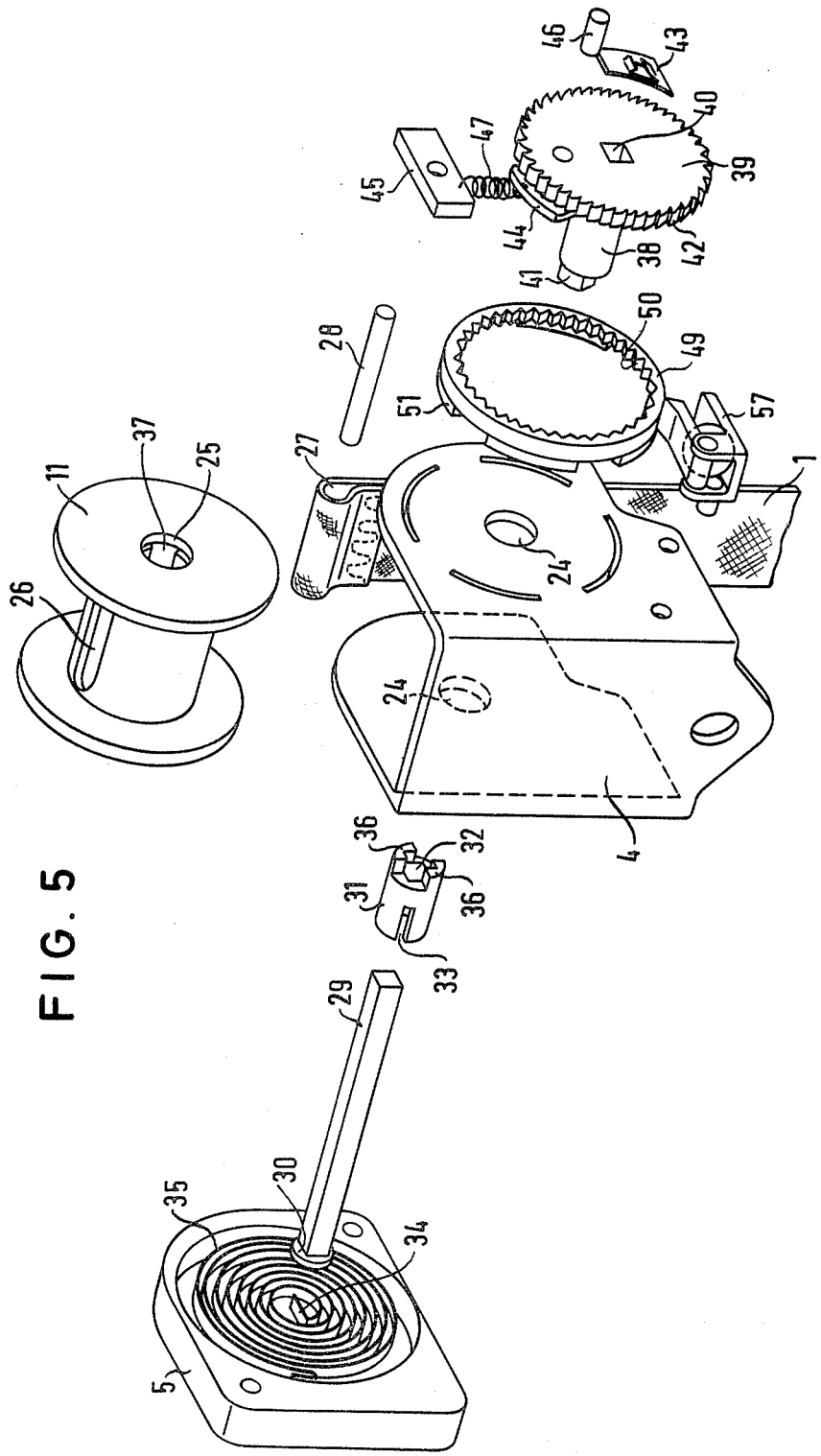
FIG. 5 is an exploded view of the automatic roll-up device according to FIGS. 3 and 4.

The construction and functioning mode of the device 2 for blocking the belt roller is explained with the aid of the FIGS. 3, 4 and 5.

The belt roller 11 has a central round support opening 25, and is symmetrically constructed, i.e. it has claw-grooves 37 at both ends of the support hole 25. Only the claw-groove at one side of the support opening 25 is visible in FIG. 5 because of the perspective representation. In FIG. 5, at the right side of the belt roller 11, one can see an elliptical line inside of the support hole 25, which clarifies a shoulder-like projection inside of the support opening 25. This is clearly shown in FIG. 3. This means that the support opening has a relative small diameter while the concentric, adjacent openings have a larger diameter. As also shown in FIG. 3, the expanded outer openings serve as bearings for the spring counter support 31 on one side and for the support hub 38 of the control disc 39 at the other side. The spring counter support 31 is pushed onto the four-cornered axis shaft 29 up to the head 30, and serves as counter support for the end of spring 34. The belt spool 11 is pushed onto the axle shaft 29, whereby the spring counter support 31 engages with its outer circumference in the outer, expanded opening of the support opening 25. Since the follower claws 36 of the spring counter support 31 extend beyond the front of the spring counter support, these follower claws 36 engage in the claw grooves 37, and establish a coupling between the spring counter support 31 and the belt spool 11. As shown in FIG. 5, the claw grooves 37 extend to the region of the more narrow support openings 25, so that by the pushing together spring counter support 31 and belt spool 11, a coupling of the follower claws 36 and the claw grooves 37 automatically is established. Now the control disc 39 is pushed onto the axle shaft 29 from the other side with the support hub 38 lying in the outer larger opening of the support opening 25, and serving as the actual bearing, and with the square shaft portion 41 acting as follower claws engaging in the claw grooves 37. Thereby, a connection which is fixed with respect to rotation is produced between the axle shaft 29 and the spring counter support 31, and also between the belt spool 11 and the control disc 39.

The U-shaped housing 4, which again may consist of aluminum or plastic, is provided with support openings 24, FIG. 5, in its free legs. The belt roller 11 has a cylindrical support hole 25, and a radial groove 26 for arresting the belt end, which for this purpose has a thickened portion 27 by forming a loop for a pin 28. A four-cornered shaft 29 has a nail-head 30. A counter-support 31 for a spring can slide on said support shaft 29 up to the head 30 and has a corresponding four-corner opening 32, and is provided with a radial slot 33, into which the inner end 34 of a spiral-shaped wind-up spring 35 is secured. The other end of the spring 35 is fastened in a conventional way at a support fixed to the housing. The counter support 31 for the spring 35 also has two follower claws 36 which engage in corresponding grooves 37 in the wall of the support opening 24 of the belt roller 11 which is mounted on the four-cornered shaft 29, whereby a coupling is produced which is rigid with respect to rotation. The outer surface of the counter support 31 for the spring 35 forms thereby one axial support for the belt roller 11. The other axial support is formed by a cylindrical support hub 38 of a control disc 39, which is also provided with an axial four corner opening 40, and with square shaft portion 41 acting as follower-claws, by which the control disc 39 can be coupled with the belt roller 11 with respect to rotation. The control disc 39 has fine outer teeth 42, and is also mounted, fixed with respect to rotation on the four-cornered shaft 29, whereby those parts which are mounted on the four-cornered shaft 29 are elastically tensioned against each other by a spring washer 43 which is fastened to the shaft end. The control disc 39 is provided at its inner side with a storage pocket 44 in which an inertial mass 45, in the form of the two-armed latch, is disposed. This inertial mass 45 can be hinged around a pin 46, and in the unactivated position a spring 47 presses a leg of latch 45 against a stop 48 inside of the storage pocket 44, as especially shown in FIG. 4. A ring 49 with inner teeth 50, is provided with engagement detents 51 by which it can engage in corresponding arc-segment-shaped openings in the housing 4, and fixedly attached to the housing. In the finished assembly, as especially shown in FIG. 3, the control disc 39 is outside of the inner teeth 50 of the ring 49, while the inertia mass 45 is located at the height of these inner teeth 50, and in the rest position, i.e. in the not-activated position, is held by the spring 47 away from the inner teeth 50.

Figure 6:
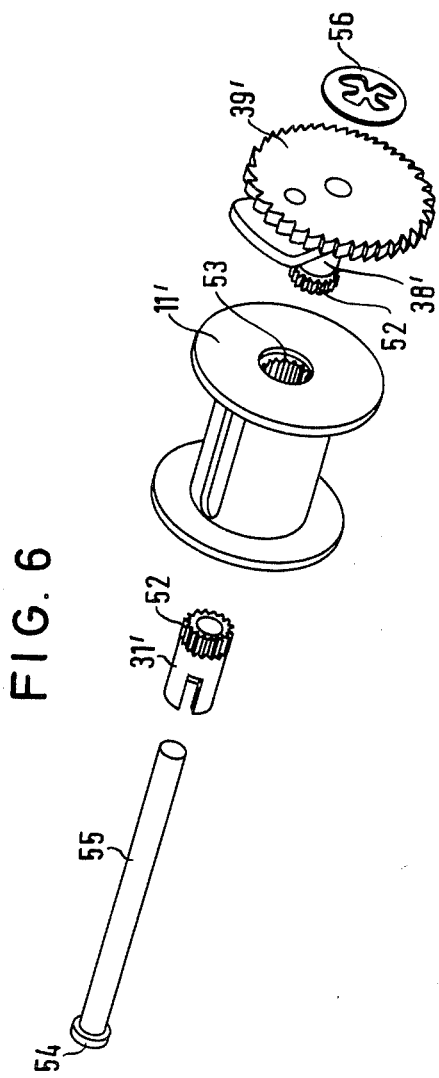
FIG. 6 shows a different construction form of several parts of the automatic roll-up device according to FIG. 5.

In the embodiment according to FIG. 6, the coupling-connection between the spring counter support 31', belt roller 11' and the control disc 39' is slightly altered with respect to the explained embodiment according to the preceding figures. Instead of a connection with claws, the spring counter support 31' and the support hub 38' of the control disc 39' are provided with coupling teeth 52 in the form of a spline. Correspondingly, at both ends of the axial support opening of the belt roller 11', counter teeth 53 are provided. The parts 31', 11' and 39' can be mounted onto an axial support shaft 55 which has a head 54, and can be tensioned against each other by a spring washer 56. However, the shaft 55 may be omitted and the parts 31', 11' and 39' may be connected and tensioned in a conventional way by locking- or snap-in connections.

An activating sensor which is sensitive to the vehicle motion generally designated 57 is shown in FIGS. 4 and 5. Sensor 57 has a support body 58 fixed to the housing 4 and contains a sphere (inertia ball) 59, and a swinging locking lever 60, which moves in the direction toward the outer teeth 42 of the control disc 39 when the sphere 59 is displaced from its median rest position.

All described parts of the mechanism 2 for blocking the belt, can be constructed in a light-weight design, for example, of aluminum or plastic, because they do not absorb large forces when the device is activated.

When the acceleration of the vehicle exceeds a predetermined value the belt roller 11 or 11' is instantaneously blocked, either by the belt-sensitive activating sensor, i.e. the inertia mass 45 which swings from the rest position to engagement with the inner teeth 50, or by the vehicle sensitive activating sensor 57 which, by the displacement sphere 59 from its median position and by engagement of the locking lever 60 with the outer teeth 42 of the control disc 39, also effects an instantaneous blocking of the belt roller 11.

The result is an immediate activation of the braking- and clamping device 3, FIG. 2, after which the belt cannnot be pulled out any further. Because the forces acting at the belt roller locking mechanism of device 2 are very low, the outer teeth 42 and/or the inner teeth 50 can be very small, so that a very short locking path is effected. Thus, there is no need for the locking means of the device 2 for blocking the belt roller to absorb high pulling forces. Instead of the mechanical mass sensor, an electromechanical control element can be used, which works in conjunction with the outer teeth 42 of the control disc 39.

I claim:

1. Automatic roll-up device for a safety belt in a vehicle with a braking or clamping device comprising, a control disc of lightweight construction in fixed, rigid connection with a belt roller rotatably mounted in a housing, a vehicle sensitive activating sensor and a belt sensitive activating sensor to activate the control disc when a predetermined acceleration or deceleration of the vehicle is exceeded, and locking means connected to the control disc to effect blocking of the belt roller, and said braking- or clamping device arranged after the belt roller and through which the belt from the belt roller passes in the direction the belt is pulled out, said braking- or clamping device activated solely by tension on the belt resulting from the blocking of the belt roller, wherein the control disc has small outer teeth, and wherein the vehicle-sensitive activating sensor has a locking lever, wherein the outer teeth can be engaged by the locking lever of the vehicle-sensitive activating sensor, wherein the control disc carries a hinged, belt-sensitive inertial mass, wherein a spring urges the mass to an inactive position, and wherein a set of small inner teeth are fixed at the housing surrounding the control disc and spaced therefrom and said mass when activated engages the set of inner teeth.

2. Automatic roll-up device according to claim 1, wherein the housing is U-shaped and made of aluminum or plastic, and wherein the belt roller is supported between the legs of the U-shaped housing, and wherein said belt roller is connected through coupling elements at one side to a wind-up spring arranged outside of one of the legs, and at the other side the belt roller is in said fixed connection with the control disc which is disposed at the outside of the other leg.

3. Automatic roll-up device for a safety belt in a vehicle with a braking or clamping device comprising, a control disc of lightweight construction in fixed, rigid connection with a belt roller rotatably mounted in a housing, a vehicle sensitive activating sensor and a belt sensitive activating sensor to acitvate the control disc when a predetermined acceleration or deceleration of the vehicle is exceeded, and locking means connected to the control disc to effect blocking of the belt roller, and said braking- or clamping device arranged after the belt roller and through which the belt from the belt roller passes in the direction the belt is pulled out, said braking- or clamping device activated solely by tension on the belt resulting from the blocking of the belt roller, wherein the control disc has outer teeth, and wherein the vehicle-sensitive activating sensor has a locking lever, wherein the outer teeth can be engaged by the locking lever of the vehicle-sensitive activating sensor, wherein the control disc carries a hinged belt-sensitive inertial mass, wherein a spring urges the mass to an inactive position, and wherein a set of inner teeth are fixed at the housing surrounding the control disc and spaced therefrom and said mass when activated engages the set of inner teeth, wherein the housing is U-shaped and made of aluminum or plastic, and wherein the belt roller is supported between the legs of the U-shaped housing, and wherein said belt roller is connected at one side to a wind-up spring arranged outside of one of the legs, and at the other side the belt roller is in said fixed connection with the control disc which is disposed at the outside of the other leg and, an axle shaft with several edges, said belt roller being mounted on said axle shaft and including an axial cylindrical hole therethrough, said belt shaft having grooves at either end thereof contiguous to said cylindrical hole, and wherein said wind-up spring is disposed adjacent one end of the shaft, and wherein onto said one end of the shaft is mounted a spring-counter support which has follower claws engaging said grooves at one end of said belt roller, said spring-counter support also engaging said wind-up spring, and wherein the control disc has an extension which has edges for engaging said grooves at the other end of the belt roller.

4. Automatic roll-up device according to claim 3, wherein the spring counter support of the belt roller and the extension of the control disc are supported on said axle shaft which has a head at one side for retaining the support on the axle shaft, and at the other side parts are tensioned against each other by a tension element.

5. Automatic roll-up device according to claim 3, wherein the spring counter-support is provided with a support hub which serves as a support for said axle shaft.

6. Automatic roll-up device according to claim 3, wherein the control disc is provided with a support hub which serves as a support for said axle shaft.

7. Automatic roll-up device according to claim 3, wherein the spring counter-support and control disc are provided with a support hub which serve as supports for said axle shaft.

8. Automatic roll-up device according to claim 3, wherein a ring is arranged at the height of the inertial mass, which ring is provided with said inner teeth and is fastened to the housing of the automatic roll-up device by engagement detents.

9. Automatic roll-up device according to claim 3, wherein the housing of the automatic roll-up device which supports the mechanism for blocking the belt roller is combined with a carrier for the braking- or clamping device to form an integral structural unit.

10. Automatic roll-up device according to claim 3, including a brake roller, a clamping bar and a carrier, wherein the braking- or clamping device has a locking pawl against which said brake roller can be moved and arrested by friction- or form locking, and wherein said brake roller is partly wrapped around by the belt, and is provided with a surface with high adhesive friction, and can move with respect to said clamping bar which is fastened to said carrier, wherein said locking pawl moves toward the belt which runs before said clamping bar, to effect clamping of the belt.

11. Automatic roll-up device for a safety belt in a vehicle with a braking or clamping device comprising, a control disc of lightweight construction in fixed, rigid connection with a belt roller rotatably mounted in a housing, a vehicle sensitive activating sensor and a belt sensitive activating sensor to activate the control disc when a predetermined acceleration or deceleration of the vehicle is exceeded, and locking means connected to the control disc to effect blocking of the belt roller, and said braking- or clamping device arranged after the belt roller and through which the belt from the belt roller passes in the direction the belt is pulled out, said braking- or clamping device activated solely by tension on the belt resulting from the blocking of the belt roller, wherein the control disc has outer teeth, and wherein the vehicle-sensitive activating sensor has a locking lever, wherein the outer teeth can be engaged by the locking lever of the vehicle-sensitive activating sensor, wherein the control disc carries a hinged, belt-sensitive inertial mass, wherein a spring urges the mass to an inactive position, and wherein a set of inner teeth are fixed at the housing surrounding the control disc and spaced therefrom and said mass when activated engages the set of inner teeth, wherein the housing is U-shaped and made of aluminum or plastic, and wherein the belt roller is supported between the legs of the U-shaped housing, and wherein said belt roller is connected at one side to a wind-up spring arranged outside of one of the legs, and at the other side the belt roller is in said fixed connection with the control disc which is disposed at the outside of the other leg, wherein the belt roller has at each end an axial support opening with inner coupling teeth, and wherein a spring counter support has outer coupling teeth which engage the inner coupling teeth at one end of the belt roller, and wherein said wind-up spring is disposed adjacent one end of said counter support with the one end engaging the end of the wind-up spring, and wherein the control disc has an extension with outer coupling teeth which engage the inner coupling teeth at the other end of the belt roller.

12. Automatic roll-up device according to claim 3 or claim 11, wherein the control disc disposed at the outside of the other leg is provided at the side toward said housing leg with a storage pocket, in which said inertial mass in the form of a two-armed pawl is contained which is hingeably supported against the force of said spring at one side.

13. Automatic roll-up device according to claim 3 or claim 11, wherein the control disc is provided at the side toward the housing leg with a storage pocket, in which said inertial mass in the form of a two-armed pawl is contained which is hingeably supported against the force of said spring at one side, and including a brake roller, a clamping bar and a carrier, wherein the braking- or clamping device has a locking pawl against which said brake roller can be moved and arrested by friction- or form locking, and wherein said brake roller is partly wrapped around by the belt, and is provided with a surface with high adhesive friction, and can move with respect to said clamping bar which is fastened to said carrier, wherein said locking pawl moves toward the belt which runs before said clamping bar, to effect clamping of the belt.

* * * * *